US012695578B2

(12) United States Patent
Elshafie et al.

(10) Patent No.: US 12,695,578 B2
(45) Date of Patent: Jul. 28, 2026

(54) CHANNEL STATE INFORMATION REPORTING BASED ON USER EQUIPMENT PARAMETERS

(71) Applicant: QUALCOMM Incorporated, San Diego, CA (US)

(72) Inventors: Ahmed Elshafie, San Diego, CA (US); Wei Yang, San Diego, CA (US); Yi Huang, San Diego, CA (US); Konstantinos Dimou, New York City, NY (US); Hwan Joon Kwon, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 584 days.

(21) Appl. No.: 18/007,128

(22) PCT Filed: Sep. 15, 2021

(86) PCT No.: PCT/US2021/071466
§ 371 (c)(1),
(2) Date: Jan. 27, 2023

(87) PCT Pub. No.: WO2022/067294
PCT Pub. Date: Mar. 31, 2022

(65) Prior Publication Data
US 2023/0231689 A1      Jul. 20, 2023

(30) Foreign Application Priority Data
Sep. 24, 2020     (GR) ............................... 20200100579

(51) Int. Cl.
| | |
|---|---|
| *H04L 5/00* | (2006.01) |
| *H04L 1/1607* | (2023.01) |
| *H04L 1/1812* | (2023.01) |

(52) U.S. Cl.
CPC .......... *H04L 5/0057* (2013.01); *H04L 1/1671* (2013.01); *H04L 1/1812* (2013.01)

(58) Field of Classification Search
CPC ... H04L 5/0057; H04L 1/1671; H04L 1/1812; H04L 5/0007; H04L 1/0027; H04L 1/003;
(Continued)

(56) References Cited

U.S. PATENT DOCUMENTS

| | | | |
|---|---|---|---|
| 2011/0243026 A1* | 10/2011 | Kim ..................... | H04B 7/0486 |
| | | | 370/252 |
| 2012/0120817 A1* | 5/2012 | Khoshnevis .......... | H04L 1/0027 |
| | | | 370/252 |

(Continued)

FOREIGN PATENT DOCUMENTS

| | | |
|---|---|---|
| EP | 3849256 A1 | 7/2021 |
| WO | 2020049736 A1 | 3/2020 |

OTHER PUBLICATIONS

Huawei R1-2005244: CSI feedback enhancements 3GPP TSG RAN WG1 Meeting #102-e Aug. 2020 (Year: 2020).*
(Continued)

*Primary Examiner* — Rina C Pancholi
(74) *Attorney, Agent, or Firm* — Patterson + Sheridan, L.L.P.

(57)      ABSTRACT

Certain aspects of the present disclosure provide techniques for channel state information (CSI) reporting based on user equipment (UE) parameters. A method that may be performed by a UE includes receiving a configuration to report aperiodic CSI. The method generally includes determining, based on one or more parameters, to send a first report including hybrid automatic repeat request (HARQ) feedback and not CSI feedback or a second report including HARQ
(Continued)

feedback and CSI feedback. The method generally includes sending the first report or the second report based on the determination.

28 Claims, 12 Drawing Sheets

(58) Field of Classification Search
CPC ..... H04L 1/0031; H04L 5/005; H04L 5/0053; H04L 5/0055; H04L 5/0062; H04L 1/0026
See application file for complete search history.

(56) References Cited

U.S. PATENT DOCUMENTS

| | | | |
|---|---|---|---|
| 2013/0195008 A1* | 8/2013 | Pelletier | H04B 7/063 370/328 |
| 2014/0036704 A1* | 2/2014 | Han | H04L 41/082 370/252 |
| 2020/0295903 A1* | 9/2020 | Faxér | H04L 1/1812 |

OTHER PUBLICATIONS

CATT: "CSI Feedback Enhancements", 3GPP Draft, 3GPP TSG RAN WG1 #102-e, R1-2005702, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051917677, 3 Pages, The Whole Document.

Huawei., et al., "CSI Feedback Enhancements", 3GPP Draft, 3GPP TSG RAN WG1 Meeting #102-e, R1-2005244, 3rd Generation Partnership Project (3GPP), Mobile Competence Centre, 650, Route Des Lucioles, F-06921 Sophia-Antipolis Cedex, France, vol. RAN WG1, No. E-meeting, Aug. 17, 2020-Aug. 28, 2020, Aug. 8, 2020, XP051917292, 4 Pages, Section 2 "A-CSI on PUCCH triggered by DL DCI" and Section 3 "Enhanced CSI feedback mode", Sections 2 and 3.

International Search Report and Written Opinion—PCT/US2021/071466—ISA/EPO—Dec. 21, 2021.

Sony: "Considerations on CSI Feedback Enhancements", 3GPP Draft, 3GPP TSG RAN WG1 #102-e, R1-2005570, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), XP051917550, 4 Pages, The Whole Document, p. 2, paragraph 1.

ZTE., et al., "URLLC PHY Enhancements", 3GPP Draft, 3GPP TSG RAN WG1 Meeting #94, R1-1808211, URLLC PHY Enhancements, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018 (Aug. 11, 2018), XP051515596, 10 Pages.

\* cited by examiner

Stage 1: 2 bits

Stage 2: $K$ bits CSI

Stage 1

Number of
RBs = X + Y

Y RBs used for Stage 2

X RBs used for Stage 1

900

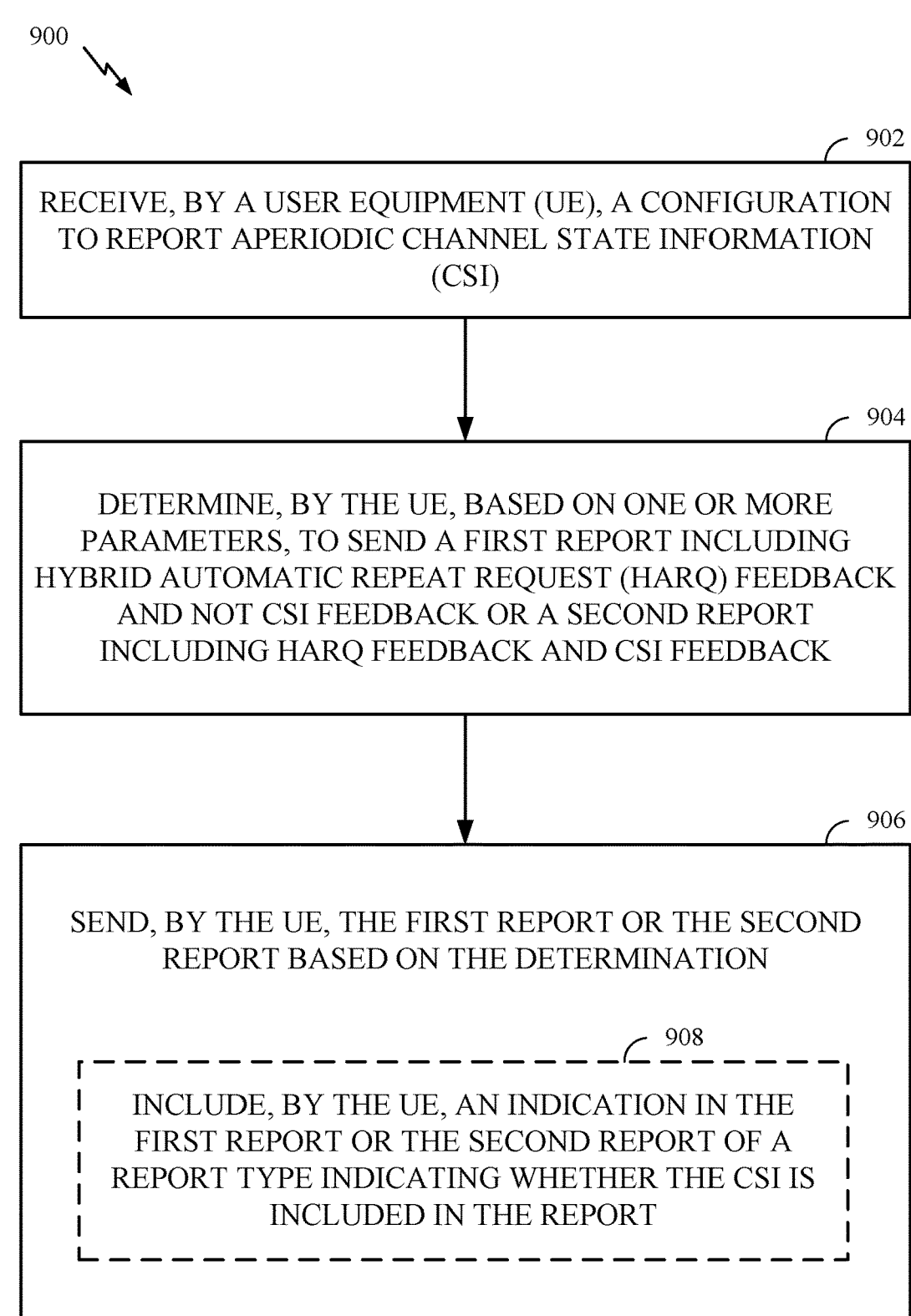

902

RECEIVE, BY A USER EQUIPMENT (UE), A CONFIGURATION TO REPORT APERIODIC CHANNEL STATE INFORMATION (CSI)

904

DETERMINE, BY THE UE, BASED ON ONE OR MORE PARAMETERS, TO SEND A FIRST REPORT INCLUDING HYBRID AUTOMATIC REPEAT REQUEST (HARQ) FEEDBACK AND NOT CSI FEEDBACK OR A SECOND REPORT INCLUDING HARQ FEEDBACK AND CSI FEEDBACK

906

SEND, BY THE UE, THE FIRST REPORT OR THE SECOND REPORT BASED ON THE DETERMINATION

908

INCLUDE, BY THE UE, AN INDICATION IN THE FIRST REPORT OR THE SECOND REPORT OF A REPORT TYPE INDICATING WHETHER THE CSI IS INCLUDED IN THE REPORT

FIG. 9

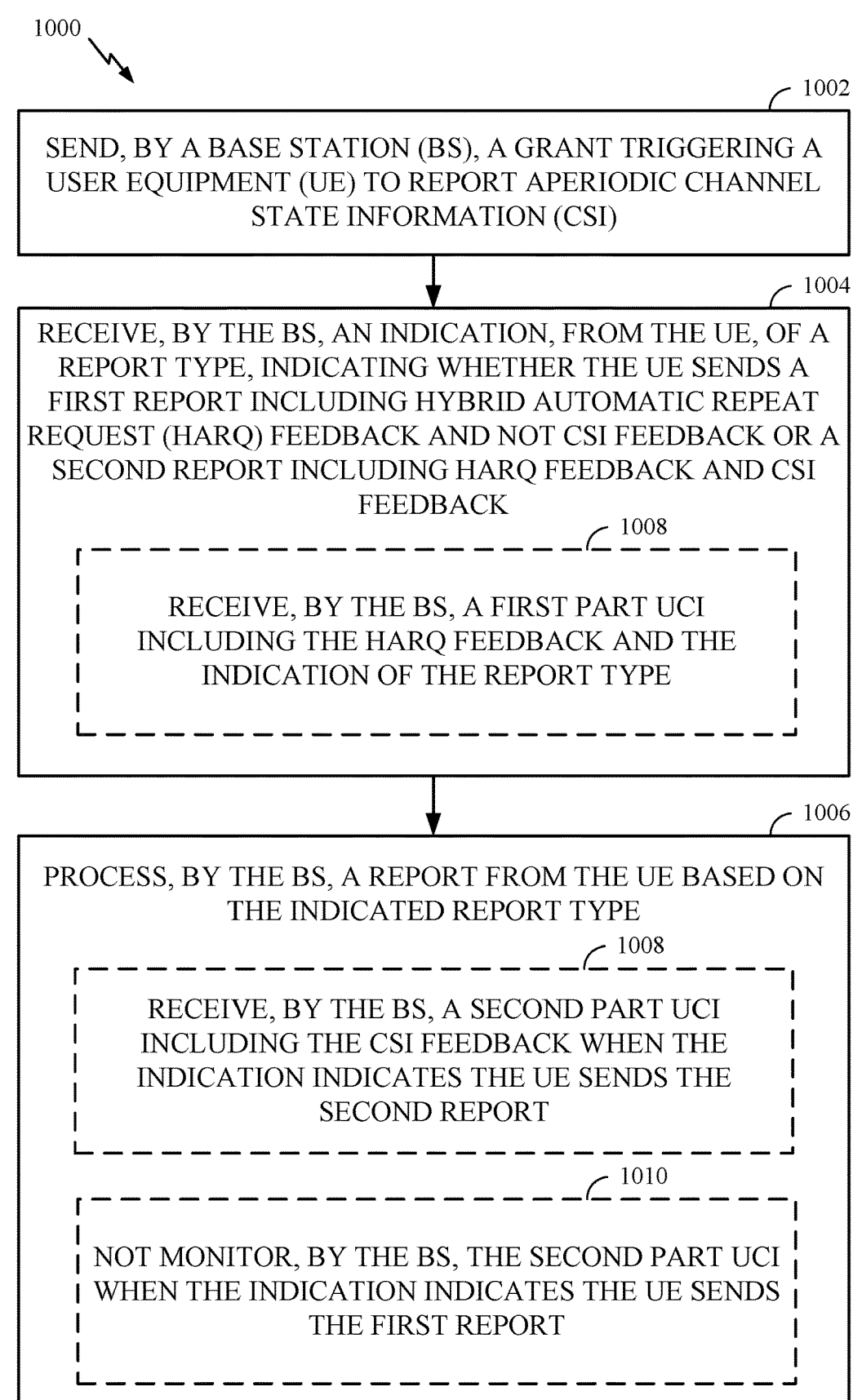

1000

1002

SEND, BY A BASE STATION (BS), A GRANT TRIGGERING A USER EQUIPMENT (UE) TO REPORT APERIODIC CHANNEL STATE INFORMATION (CSI)

1004

RECEIVE, BY THE BS, AN INDICATION, FROM THE UE, OF A REPORT TYPE, INDICATING WHETHER THE UE SENDS A FIRST REPORT INCLUDING HYBRID AUTOMATIC REPEAT REQUEST (HARQ) FEEDBACK AND NOT CSI FEEDBACK OR A SECOND REPORT INCLUDING HARQ FEEDBACK AND CSI FEEDBACK

1008

RECEIVE, BY THE BS, A FIRST PART UCI INCLUDING THE HARQ FEEDBACK AND THE INDICATION OF THE REPORT TYPE

1006

PROCESS, BY THE BS, A REPORT FROM THE UE BASED ON THE INDICATED REPORT TYPE

1008

RECEIVE, BY THE BS, A SECOND PART UCI INCLUDING THE CSI FEEDBACK WHEN THE INDICATION INDICATES THE UE SENDS THE SECOND REPORT

1010

NOT MONITOR, BY THE BS, THE SECOND PART UCI WHEN THE INDICATION INDICATES THE UE SENDS THE FIRST REPORT

FIG. 10

CHANNEL STATE INFORMATION REPORTING BASED ON USER EQUIPMENT PARAMETERS

CROSS-REFERENCE TO RELATED APPLICATION(S)

This application is a national stage application under 35 U.S.C. 371 of PCT/2021/071466, filed Sep. 15, 2021, which claims benefit of and priority to Greek Provisional Application No. 20200100579, filed Sep. 24, 2020, which are hereby assigned to the assignee hereof and hereby expressly incorporated by reference herein in their entirety as if fully set forth below and for all applicable purposes.

FIELD OF THE DISCLOSURE

Aspects of the present disclosure relate to wireless communications, and more particularly, to techniques for channel state information reporting based on user equipment (UE) parameters. Aspects provide for a dynamic reporting type based on configuring from a base station (BS), signal quality parameters, and/or UE capability.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved channel state information (CSI) reporting.

Certain aspects of the subject matter described in this disclosure can be implemented in a method for wireless communication by a user equipment (UE). The method generally includes receiving a configuration to report aperiodic CSI. The method generally includes determining, based on one or more parameters, to send a first report including hybrid automatic repeat request (HARQ) feedback and not CSI feedback or a second report including HARQ feedback and CSI feedback. The method generally includes sending the first report or the second report based on the determination.

Certain aspects of the subject matters described in this disclosure can be implemented in a method for wireless communication by a base station (BS). The method generally includes sending a grant triggering a UE to report aperiodic CSI. The method generally includes receiving an indication, from the UE, of a report type indicating whether the UE sends a first report including HARQ feedback and not CSI feedback or a second report including HARQ feedback and CSI feedback. The method generally includes processing a report from the UE based on the indicated report type.

Certain aspects of the subject matter described in this disclosure can be implemented in an apparatus for wireless communication. The apparatus generally includes at least one processor; and a memory coupled to the at least one processor. The memory generally include code executable by the at least one processor to cause the apparatus to receive a configuration to report aperiodic CSI. The memory generally include code executable by the at least one processor to cause the apparatus to determine, based on one or more parameters, to send a first report including HARQ feedback and not CSI feedback or a second report including HARQ feedback and CSI feedback. The memory generally include code executable by the at least one processor to cause the apparatus to send the first report or the second report based on the determination.

Certain aspects of the subject matters described in this disclosure can be implemented in an apparatus for wireless communication. The apparatus generally includes at least one processor; and a memory coupled to the at least one processor. The memory generally include code executable by the at least one processor to cause the apparatus to send a grant triggering a UE to report aperiodic CSI. The memory generally include code executable by the at least one processor to cause the apparatus to receive an indication, from the UE, of a report type indicating whether the UE sends a first report including HARQ feedback and not CSI feedback or a second report including HARQ feedback and CSI feedback. The memory generally include code executable by the at least one processor to cause the apparatus to process a report from the UE based on the indicated report type.

Certain aspects of the subject matters described in this disclosure can be implemented in an apparatus for wireless communications. The apparatus generally includes means for receiving a configuration to report aperiodic CSI. The apparatus generally includes means for determining, based on one or more parameters, to send a first report including HARQ feedback and not CSI feedback or a second report including HARQ feedback and CSI feedback. The apparatus generally includes means for sending the first report or the second report based on the determination.

Certain aspects of the subject matters described in this disclosure can be implemented in an apparatus for wireless communications. The apparatus generally includes means for sending a grant triggering a UE to report aperiodic CSI. The apparatus generally includes means for receiving an indication, from the UE, of a report type indicating whether the UE sends a first report including HARQ feedback and not CSI feedback or a second report including HARQ feedback and CSI feedback. The apparatus generally includes means for processing a report from the UE based on the indicated report type.

Certain aspects of the subject matters described in this disclosure can be implemented in a computer readable medium storing computer executable code thereon for wireless communications. The computer readable medium generally includes code for receiving a configuration to report aperiodic CSI. The computer readable medium generally includes code for determining, based on one or more parameters, to send a first report including HARQ feedback and not CSI feedback or a second report including HARQ feedback and CSI feedback. The computer readable medium generally includes code for sending the first report or the second report based on the determination.

Certain aspects of the subject matters described in this disclosure can be implemented in a computer readable medium storing computer executable code thereon for wireless communications. The computer readable medium generally includes code for sending a grant triggering a UE to report aperiodic CSI. The computer readable medium generally includes code for receiving an indication, from the UE, of a report type indicating whether the UE sends a first report including HARQ feedback and not CSI feedback or a second report including HARQ feedback and CSI feedback. The computer readable medium generally includes code for processing a report from the UE based on the indicated report type.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure may be understood in detail, a more particular description, briefly summarized above, may be had by reference to aspects, some of which are illustrated in the drawings. It is to be noted, however, that the appended drawings illustrate only certain aspects of this disclosure and, for the description may admit to other equally effective aspects.

FIG. 9 is a flow diagram illustrating example operations for wireless communication by a UE, in accordance with certain aspects of the present disclosure.

FIG. 10 is a flow diagram illustrating example operations for wireless communication by a BS, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
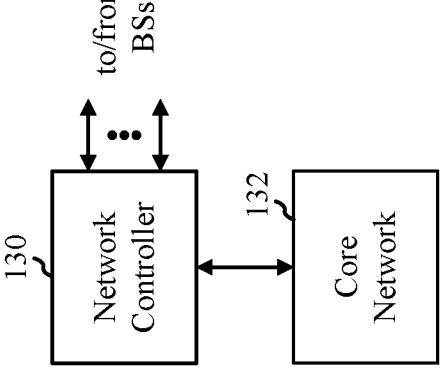
FIG. 1 is a block diagram conceptually illustrating an example wireless communication network, in accordance with certain aspects of the present disclosure.

Aspects of the present disclosure provide apparatus, methods, processing systems, and computer readable mediums for channel state information (CSI) reporting based on user equipment (UE) parameters.

In some systems, a base station (BS) may schedule a UE to transmit an aperiodic CSI report. However, CSI feedback (e.g., a CSI report) may increase the payload, and thus may decrease reliability of the report and the reliability of hybrid automatic repeat request (HARQ) feedback (e.g., acknowledged (ACK)/negative acknowledgment (NACK) feedback), which is important for retransmission decisions by the BS. Accordingly, to reduce latency and increase reliability, a UE may decide (e.g., dynamically determine) whether to include the CSI report with the HARQ feedback. For example, the UE may determine whether to include the CSI based on various parameters (e.g., parameters regarding the signal received by the UE and/or the UE's capabilities). The UE may send an indication to the BS indicating the report type as a report that includes or excludes the CSI feedback. The UE may send a report type indicator along with the HARQ feedback in a first stage of uplink control information (UCI). If the UE sends the CSI feedback, the UE may send the CSI feedback in a second stage of the UCI. The BS may process the report based on the indication of the report type from the UE. For example, if the report type in the first stage UCI indicates that the UE does not send the CSI feedback, then the BS may disregard (e.g., not monitor) the second stage UCI.

The following description provides examples of CSI reporting based on UE parameters in communication systems. Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave (mmWave), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured for CSI reporting based on UE parameters. As shown in FIG. 1, the BS 110a includes a CSI reporting manager 112 that receives a report type indication from the UE 120a indicating whether the UE 120a sends CSI feedback with HARQ feedback and that processes a report from the UE based on the indication, in accordance with aspects of the present disclosure. The UE 120a includes a CSI reporting manager 122 that determines whether to send CSI feedback with HARQ feedback and that sends a report based on the determination, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
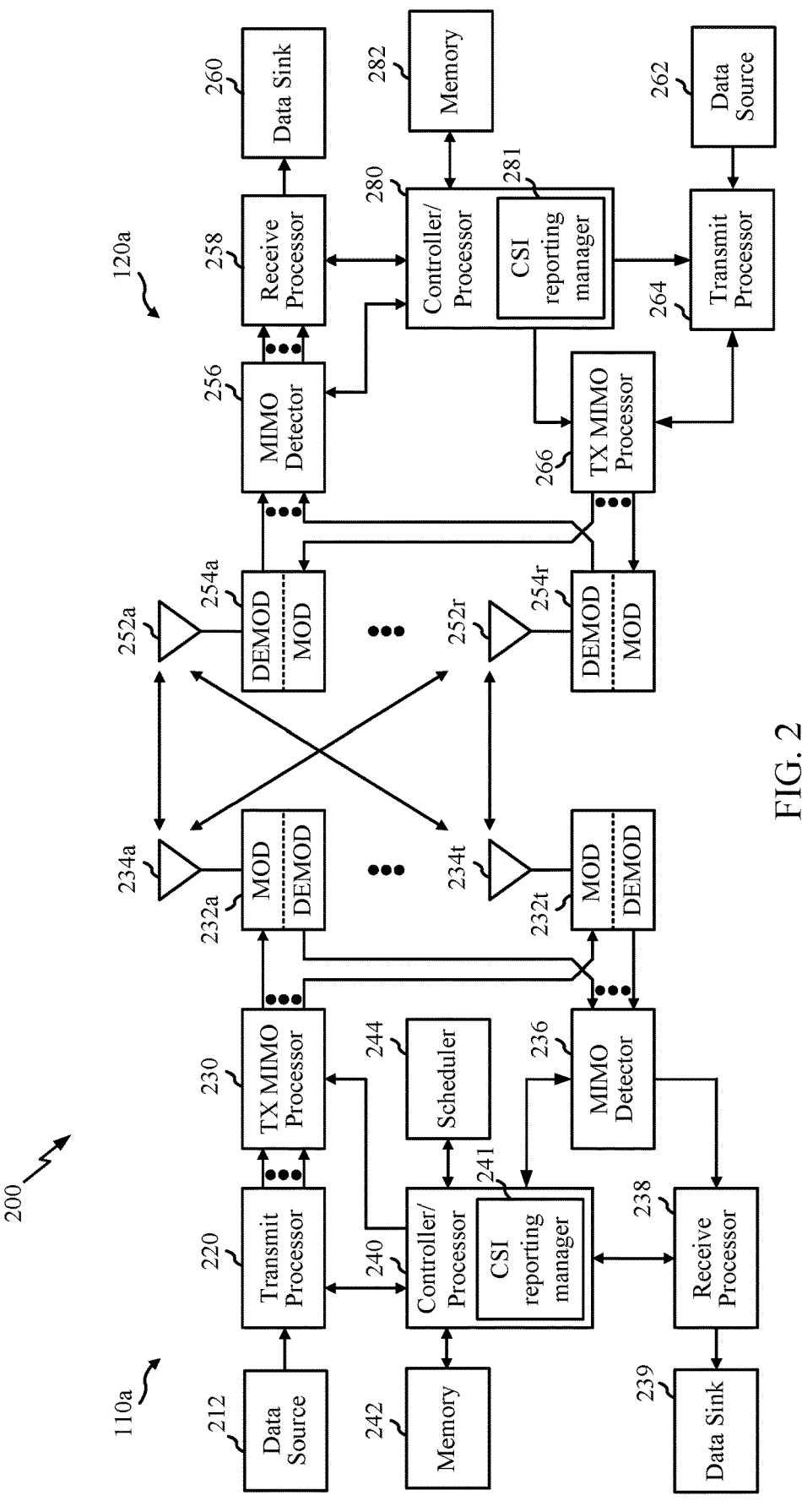
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a*. At the BS 110*a*, the uplink signals from the UE 120*a* may be received by the antennas 234, processed by the demodulators in transceivers 232*a*-232*t*, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has a CSI reporting manager 241 that receives an indication whether the UE sends CSI feedback with HARQ feedback and that processes a report based on the indication, according to aspects described herein. As shown in FIG. 2, the controller/processor 280 of the UE 120*a* has a CSI reporting manager 281 that determines whether to send CSI feedback with HARQ feedback and that sends a report based on the determination, according to aspects described herein. Although shown at the controller/processor, other components of the UE 120*a* and BS 110*a* may be used to perform the operations described herein.

NR may utilize OFDM with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
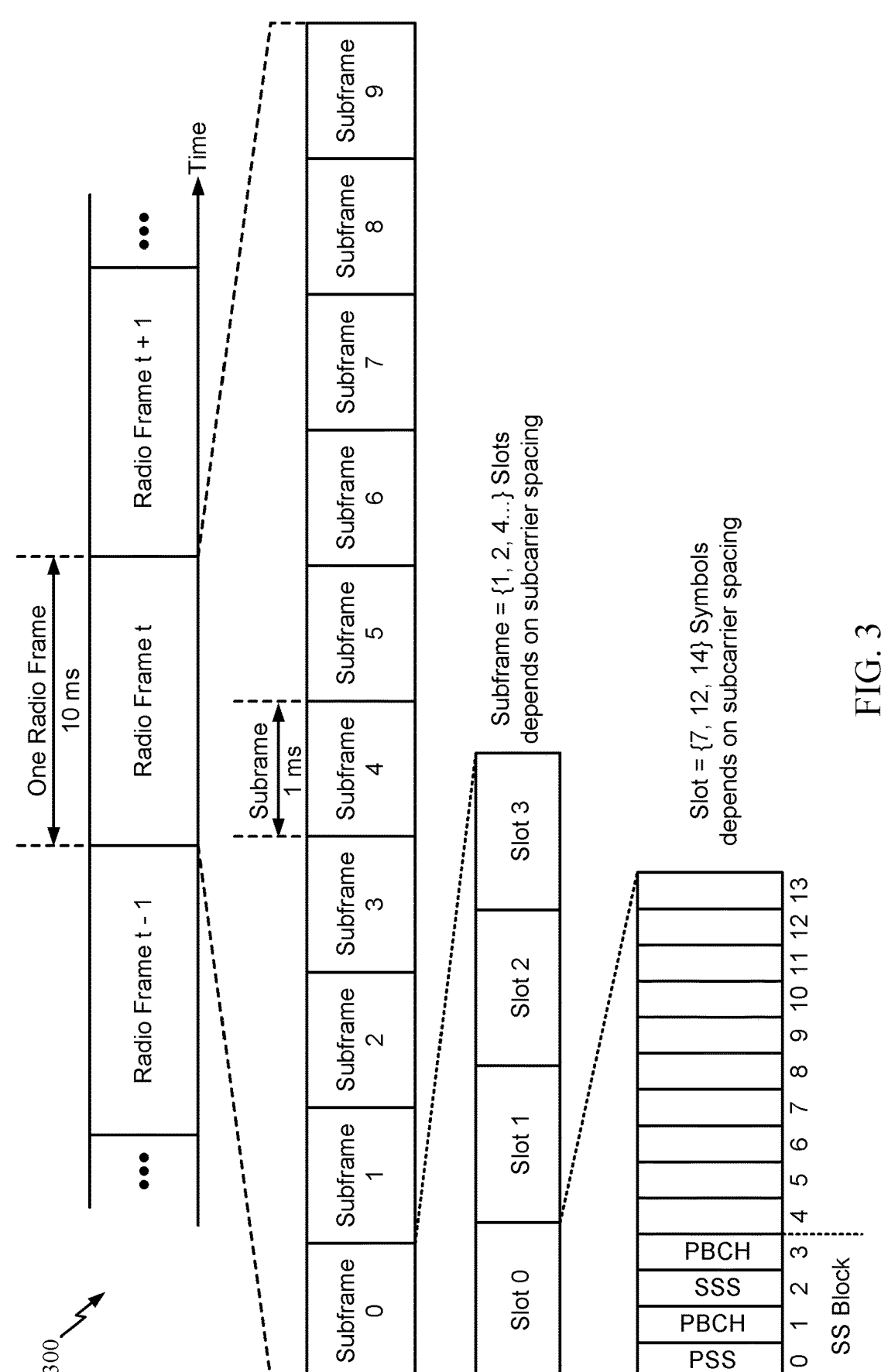
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some NR systems, the network entity (e.g., a BS) may schedule the UE to transmit an aperiodic CSI report (A-CSI). The UE may be configured to transmit the A-CSI report in UCI on a PUCCH or, in some cases, multiplexed on a PUSCH transmission. The A-CSI may be triggered using the UL grant.

Figure 4:
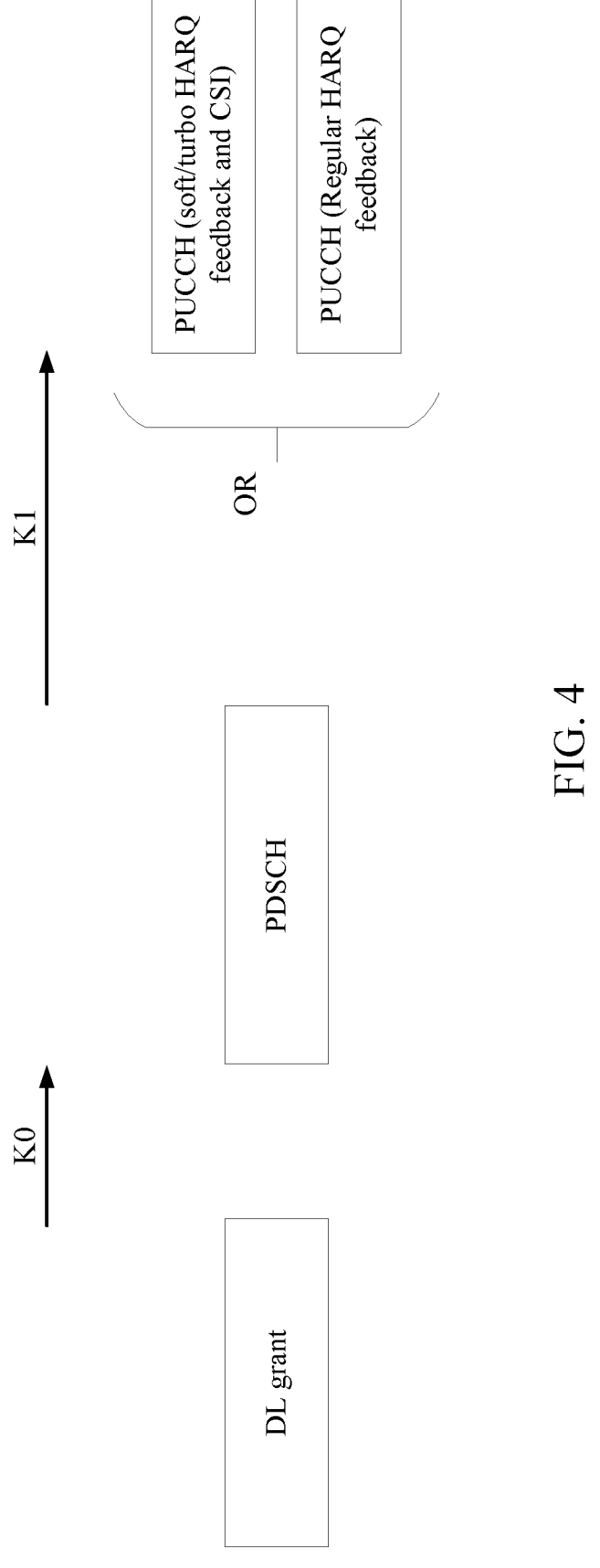
FIG. 4 is a block diagram illustrating example channel state information (CSI) reporting based on physical downlink shared channel (PDSCH), in accordance with certain aspects of the present disclosure.

FIG. 4 illustrates an example CSI report based on PDSCH. As illustrated in FIG. 4, the BS sends a DL grant (e.g., downlink control information (DCI) in a PDCCH) scheduling a PDSCH transmission. The PDSCH may be scheduled after a delay, K0, between the DL grant and corresponding DL data (e.g., the PDSCH). The UE may include HARQ feedback for the PDSCH after a delay, K1, between the DL data (i.e., the PDSCH) reception and the corresponding HARQ feedback transmission on the UL (e.g., PUCCH). The UE may also be configured to send CSI feedback in the PUCCH with the HARQ feedback. For example, the UE may be configured to provide CSI feedback based on measurements of the PDSCH transmission. As shown in FIG. 4, when the UE sends a report including the HARQ-ACK feedback, this may be referred to herein as a regular HARQ-ACK report. When the UE sends a report including both the HARQ-ACK feedback and the CSI feedback, this may be referred to as a soft (or turbo) HARQ-ACK report.

Figure 5:
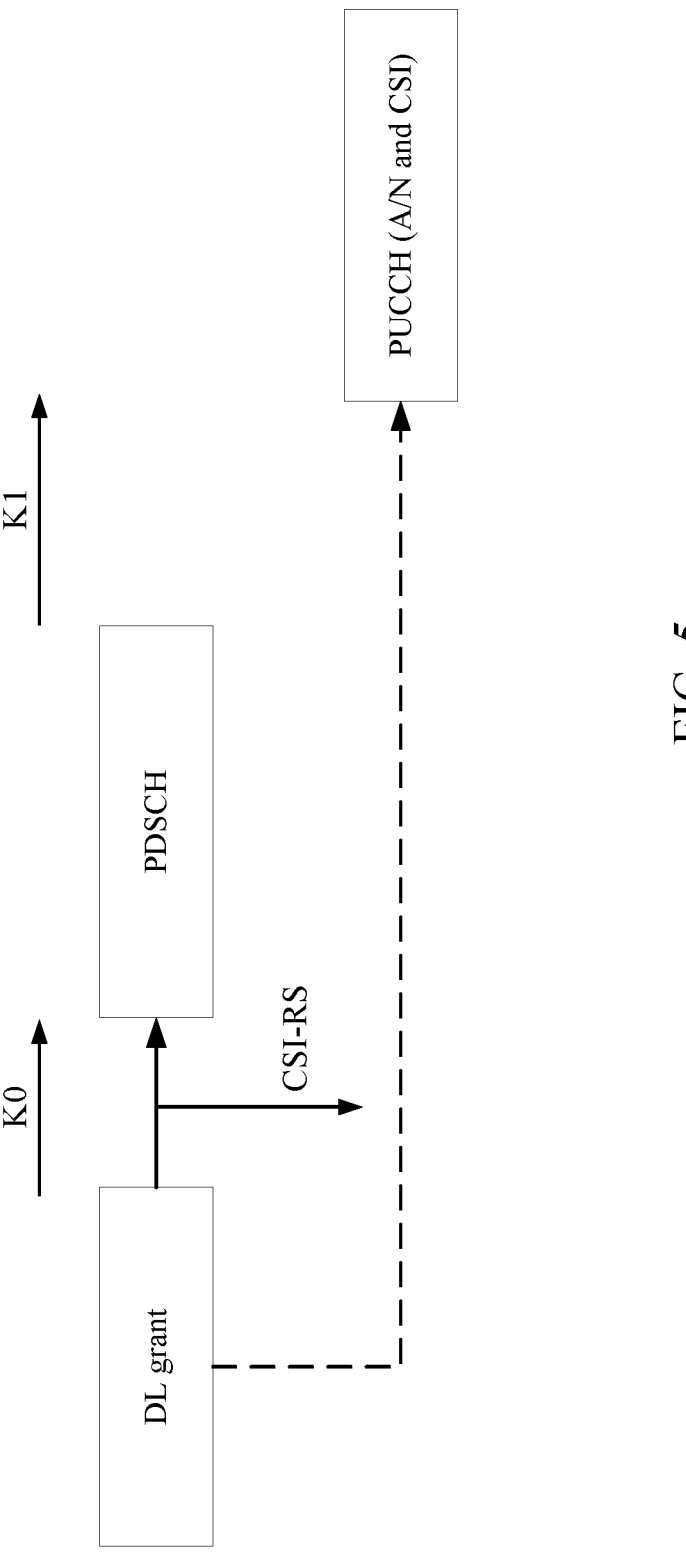
FIG. 5 is a block diagram illustrating example CSI reporting based CSI reference signal(s), in accordance with certain aspects of the present disclosure.

FIG. 5 illustrates the CSI reporting based on CSI-RS. As shown in FIG. 5, the BS may send a downlink grant scheduling the PDSCH and also one or more downlink grants triggering/activating one or more CSI-RS resources. In this case, the UE may be configured to report CSI feedback based on measurements of the CSI-RS. As shown in FIG. 5, the UE may receive the CSI-RS. The UE may monitor the PDSCH and the UE may send HARQ-ACK feedback for the PDSCH with a CSI report based on the CSI-RS, in the PUCCH.

However, CSI feedback/reports increase the payload size of the UCI transmission, which may impact the reliability of CSI report as well as reliability of the HARQ-ACK feedback when sent with the HARQ-ACK report. HARQ-ACK feedback is important information for the BS to make retransmission decisions.

Accordingly, what is needed are techniques and apparatus for reducing latency and increasing reliability in CSI reporting.

Example CSI Reporting Based on UE Parameters

Aspects of the present disclosure provide channel state information (CSI) reporting that may be dynamic. For example, a user equipment (UE) may determine whether to report CSI based on parameters, such as received signal parameters, UE capability, and/or configuration information from a base station (BS). A UE, configured to transmit aperiodic CSI, may decide whether to send a regular hybrid automatic repeat request (HARQ) feedback report, that does not include (e.g., excludes) CSI feedback, or to send a soft HARQ feedback report that includes CSI feedback (e.g., a CSI report). The UE may send an indication of the report type to the BS. The BS may use the report type indication to process a feedback report from the UE. The BS may not have to decode CSI feedback. Accordingly, because the UE sends a report without CSI feedback and the BS does not decode CSI feedback, the BS and UE save power.

Figure 6A:
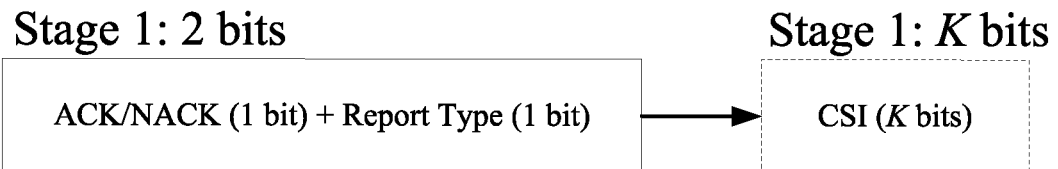
FIGS. 6A-C are block diagrams illustrating example regular and soft report types with a report type indicator, in accordance with certain aspects of the present disclosure.

In certain aspects, the UE may send two stage uplink control information (UCI). In using two stage UCI, the UE may send the HARQ feedback and an indication of the type of report in a first stage of the UCI and, if transmitted, the UE may send the CSI feedback in a second stage of the UCI. As illustrated in FIG. 6A, in the first stage UCI, the UE may send the HARQ feedback (e.g., 1 bit to indicate acknowledged (ACK) or not acknowledged (NACK)) and the report type indicator (e.g., 1 bit to indicate Report Type 0 or Report Type 1) and in the second stage of the UCI the UE may send K bits of CSI (e.g., K may be configured in a CSI report setting from the BS). For the Report Type 0, the UE has determined to send the regular HARQ-ACK report that does not include the CSI feedback. For the Report Type 0, the UE has determined to send the soft HARQ-ACK report that includes the CSI feedback.

As mentioned above, the UE may send HARQ feedback as one bit and the report type indication as another bit. The report type indicator bit may indicate whether the CSI report is "on" (e.g., indicated the soft report type) or "off" (e.g., indicating the regular report type). Thus, a 2-bit HARQ-ACK feedback may be reported to indicate: an ACK and that CSI will be reported; a NACK and that CSI will be reported; an ACK and that CSI will not be reported; or a NACK and that CSI will not be reported.

In some aspects, the HARQ feedback may be tri-state indicating: ACK, NACK, or "downlink control information (DCI) was mis-detected". For the HARQ feedback state of the "DCI was mis-detected", this means that the UE missed or could not decode the downlink grant and/or DCI. The UE may still use two bits for the tri-state HARQ feedback and report type indicator. The two bit HARQ-ACK feedback may indicate: DCI was mis-detected; an ACK and that CSI will be reported; a NACK and that CSI will reported; an ACK and that CSI will not be reported; or a NACK and that CSI will not be reported.

Figure 6B:
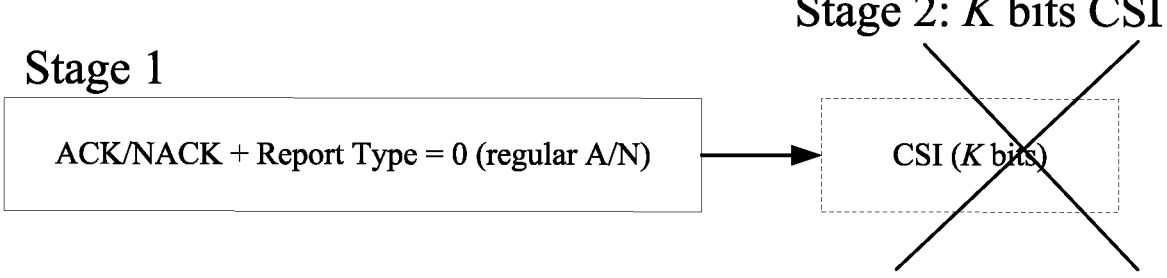
Figure 6C:

The BS may determine whether to expect a second report based on the report type. As shown in FIG. 6B, the UE may send the first stage UCI with the HARQ-ACK feedback and the report type indicator indicating the Report Type 0. Thus, as shown in FIG. 6B, the UE does not send K bit second stage of the UCI. In this case, the BS determines that the UE will not send the second stage and may disregard (e.g., not monitor) the second stage UCI. As shown in FIG. 6C, the UE may send the first stage UCI with the HARQ-ACK feedback and the report type indicator indicating the Report Type 1. Thus, as shown in FIG. 6C, the UE has send the K bit CSI report in the second stage UCI. In this case, the BS determines that the UE will send the second stage UCI and will monitor for second stage UCI with the CSI feedback.

Figure 7:
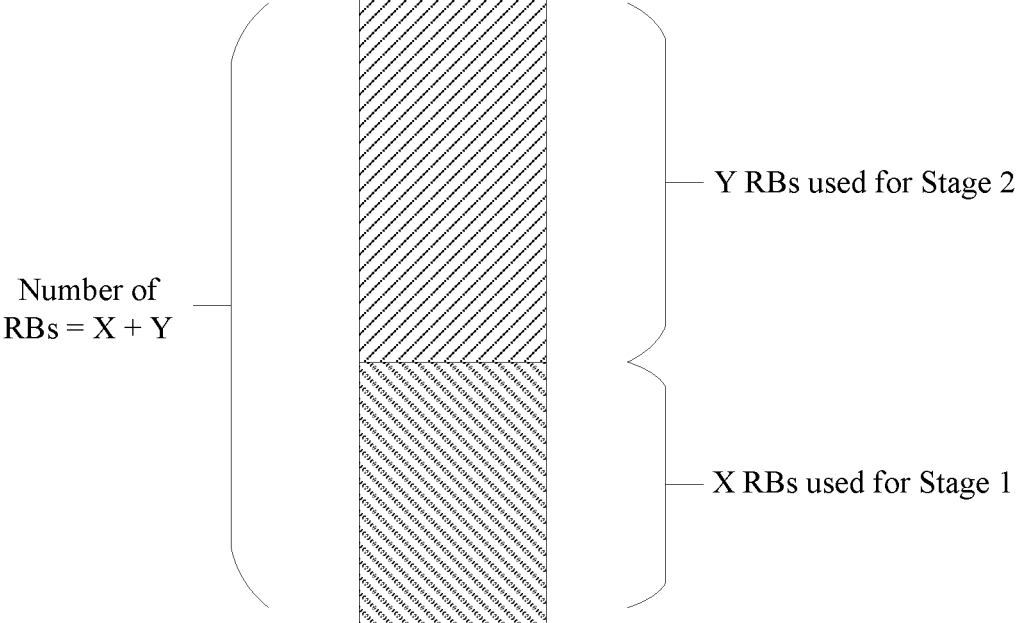
FIG. 7 is a block diagram illustrating example two-stage uplink control information (UCI), in accordance with certain aspects of the present disclosure.

The two-stage UCI may use different resources. The first stage and second stage UCI may be on different slot, have separate uplink grants, and/or may have different resource blocks (RBs) allocated with a slot. FIG. 7 illustrates an example resource allocation for two-stage UCI. As illustrated, a number of RBs (10 RBs in the illustrated example) may be allocated for the UCI in the physical uplink control channel (PUCCH) resource. A first number of the RBs may be assigned to UCI stage 1 (e.g., 4 RBs for a 2-bit stage 1) and a second number of RBs may be assigned to send the UCI stage 2 (e.g., 6 RBs for a K-bit CSI payload).

According to certain aspects, the UE determines the report type (e.g., whether to include the CSI feedback in the HARQ-ACK feedback report) based received signal quality. The UE may determine the received signal quality by measuring a signal-to-interference noise ratio (SINR), based on an estimated spectral efficiency (SPEF), estimated interference, observed block error rate (BLER), bit error rate (BER), a number of resource blocks (RBs) required to achieve certain BLER, a number of ACKed/NACKed code blocks (CBs) and/or code block groups (CBGs), the best next redundancy version (RV), and/or log-likelihood ratio (LLR) quality (e.g., even with cyclic redundancy check (CRC) pass). The report type determination may also be based on the UE capability for performing CSI computation.

In an illustrative example when the CSI feedback is generated based on physical downlink shared channel (PDSCH), the PDSCH transmissions may use RVs based on a sequence of RVs (e.g., {0, 2, 3, 1}). For example, for a first transmission, RV0 is used, which has systematic bits and is self-decodable. In a next transmission (e.g., a retransmission) after RV0, the BS may use RV2. If the signal received by the UE is very noisy (e.g., high interference, small log-likelihood ratios), then the UE may report CSI for the RV0 or RV3 PDSCH transmission, instead of reporting CSI for the RV2 PDSCH transmission, because RV2 is not self-decodable while RV0 and RV3 are self-decodable. Thus, after the RV2 PDSCH transmission, the UE would send a HARQ-ACK report that does include CSI.

In an illustrative example when the CSI feedback is generated based on either PDSCH or CSI reference signal (CSI-RS), the UE may determine whether to send CSI feedback based on MCS. For example, the UE may measure a SINR value and map the SINR to a channel quality indicator (CQI) or modulation and coding scheme (MCS). In this case, the UE knows the MCS used for the current transmission. If the observed MCS is lower than the current MCS by a certain level (e.g., a threshold level), then the UE may determine to send the report including the CSI feedback to let the network know the difference.

In another illustrative example, when the CSI feedback is generated based PDSCH, the UE may determine whether to send CSI feedback on a number of ACKed or NACKed CBs and/or CBGs. For example, if the number of NACKed CBs is high (e.g., above a threshold), then the UE determines that there may be an issue (e.g., low signal quality) with the received signal. Accordingly, the UE may send the report including the CSI feedback.

In another illustrative example, when the CSI feedback is generated based on PDSCH or CSI-RS, the UE may determine whether to send CSI feedback based on SINR of the received signal. For example, if the SINR of the received signal is below a threshold (e.g., relative to a nominal SINR, a known SINR value, or the SINR required for decoding), the UE may send the report including the CSI feedback.

In yet another illustrative example, when the CSI feedback is generated based on PDSCH, the UE may determine whether to send CSI feedback based on BER of the received signal. For example, if the BER of the received signal is high (e.g., above a threshold), the UE may send the report including the CSI feedback.

Figure 8:
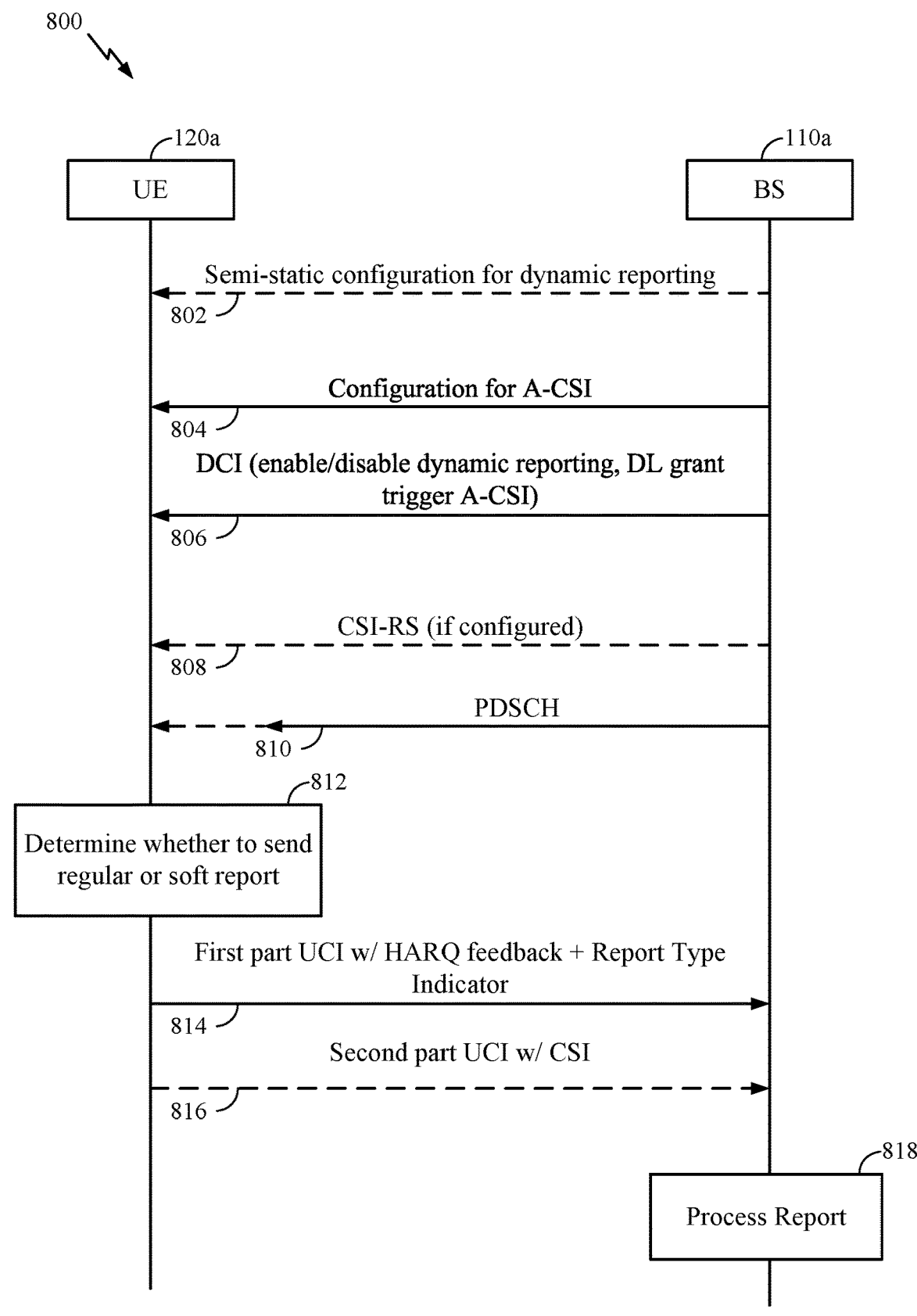
FIG. 8 is a call flow diagram illustrating example signaling for dynamic CSI reporting based on UE parameters, in accordance with aspects of the present disclosure.

FIG. 8 is a call flow diagram illustrating example signaling 800 for dynamic CSI reporting, in accordance with aspects of the present disclosure. At 802, the UE 120a may receive semi-static signaling of a configuration of dynamic reporting. For example, the configuration may indicate whether the dynamic reporting feature is supported. The network may send the semi-static signaling via radio resource control (RRC) or medium access control (MAC) control element (MAC-CE) signaling. The semi-static signaling may also indicate a duration (e.g., a number of downlink grants or a number of time slots) for dynamic reporting when dynamic reporting is supported and enabled. At 804, the UE receives a configuration for aperiodic CSI reporting from the BS 110a. At 806, the UE may receive DCI. The DCI may include an indication to enable or disable the dynamic reporting feature. When the configured duration expires, or if the dynamic reporting feature is not supported or not enabled, then the UE may send HARQ feedback without the report type indication and send CSI feedback as configured by the BS.

The DCI may also include one or more downlink grants triggering aperiodic CSI (A-CSI) reporting. The DCI schedules a data transmission (e.g., the PDSCH transmission at 810). In some cases, the DCI may trigger CSI-RS resources (e.g., for the CSI-RS transmission at 808).

At 808, if the UE 120a is configured to report CSI based on CSI-RS, the UE receives one or more CSI-RSs. The UE may measure the CSI-RS resource(s) to generate CSI feedback information. At 810, the UE 120a monitor for the scheduled data transmission (e.g., the PDSCH). The UE may determine the HARQ-ACK feedback based on the monitoring (e.g., an ACK if the PDSCH is successfully decoded or a NACK if the PDSCH is not successfully decoded).

At 812, the UE determines whether to send a regular or soft HARQ feedback report (e.g., when the feature is supported and enabled). The UE then sends the HARQ feedback report with or without a CSI report based on the determination. At 814, the UE sends a first part UCI with HARQ feedback and including the report type indicator. At 816, based on the determination, the UE may send a second part UCI with the CSI feedback or does not the second part UCI. At 818, the BS processes the report based on the report type indication. For example, the BS receives the first part UCI and then determines whether to monitor the second part UCI based on the report type.

FIG. 9 is a flow diagram illustrating example operations 900 for wireless communication, in accordance with certain aspects of the present disclosure. The operations 900 may be performed, for example, by a UE (e.g., such as the UE 120a in the wireless communication network 100). The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at 902, by receiving a configuration to report A-CSI. Receiving the configuration to report the aperiodic CSI may involve receiving a downlink grant for a CSI-RS, a PDSCH, or both triggering the A-CSI.

At 904, the UE determines, based on one or more parameters, to send a first report including HARQ feedback and not CSI feedback or a second report including HARQ feedback and CSI feedback. These parameters may include at least one of an estimated SPEF, a received signal quality, a BLER, a BER, an estimated interference level, a best next redundancy version, a MCS, a SINR, a number of acknowledged or negative acknowledged CBs, a ratio between negative acknowledge CBs over a total number of CBs, a number of acknowledged or negative acknowledged CBGs, a ratio between the negative acknowledged CBGs over a total number of CBGs, one or more LLRs, and/or a number of RBs to achieve a target BLER. In some aspects, the determination may be further based on a capability of the UE to perform CSI computations.

At 906, the UE sends the first report or the second report based on the determination. In some aspects, sending the first report or the second report may involve including an indication in the first report or the second report of a report type indicating whether the CSI is included in the report (at 908). In some aspects, sending the first report or the second report comprises sending a first part uplink control information (UCI) including the HARQ feedback and the indication of the report type, and sending a second part UCI including the CSI feedback when the UE sends the first report or excluding the CSI feedback when the UE sends the second report. In some aspects, sending the first report or the second report may involve sending the first part UCI using a first set of resource, and sending the second part UCI using a second set of resources different from the first set of resources. The first set of resources and the second set of resources may include different slots, different resource blocks with the same slot, or both.

In some aspects, the UE may receive semi-static signaling via at least one of RRC or MAC-CE indicating whether dynamic reporting using the first and second reports is supposed. In such aspects, the UE may receive an indication via DCI to enable or disable the dynamic reporting. The semi-static signaling may further indicate a number of downlink grants or time slots for dynamic reporting when enabled. When dynamic reporting is not supported or is disabled, or after the indicated number of downlink grants or timeslots, the UE may send the report including HARQ feedback and CSI feedback as configured by the BS.

FIG. 10 is a flow diagram illustrating example operations 1000 for wireless communication, in accordance with certain aspects of the present disclosure. The operations 1000 may be performed, for example, by a BS (e.g., such as the BS 110a in the wireless communication network 100). The operations 1000 may be complimentary to the operations 900 performed by the UE. The operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may begin, at 1002, by sending a grant triggering a UE to report aperiodic CSI.

At 1004, the BS receives an indication, from the UE, of a report type indicating whether the UE sends a first report including HARQ feedback and not CSI feedback or a second report including HARQ feedback and CSI feedback. In some aspects, the BS receiving the indication indicating the report type involves (at 1008) the BS receiving, a first part UCI including the HARQ feedback and the indication of the report type.

At 1006, the BS processes a report from the UE based on the indicated report type. In some aspects, the BS processing the report from the UE involves (at 1008) the BS receiving a second part UCI including the CSI feedback when the indication indicates the UE sends the second report, and (at 1010) the BS not monitoring the second part UCI when the indication indicates the UE sends the first report.

In some aspects, the network may send semi-static signaling via at least one RRC or MAC-CE indicating whether dynamic reporting using the first and second reports is supported. In further aspects, the network may send an indication via DCI to enable or disable the dynamic reporting. The semi-static signaling may further indicate a number of downlink grants or time slots for dynamic reporting when enabled. When dynamic reporting is not supported or disabled, or after the indicated number of downlink grants or time slots, the BS may receive the report including HARQ feedback and CSI feedback as configured by the BS.

In some aspects, the UE may recommend rank changes. If the UE measures that the rank of the current PDSCH decreases, the UE can tell the BS the current rank of the PDSCH and the CQI per rank. For example, if the PDSCH is scheduled with rank 4 with 4 DMRS ports, the UE can measure the CQI of each layer and send feedback of the CQI of each layer. In some aspects, the UE can measure the CQI of each layer and send feedback of the strongest or the weakest layers. The transmitter of the BS may decide to use a subset of layers and/or pre-coders to use for the remaining PDSCH transmissions before getting a new pre-coding matrix indicator (PMI) estimation.

Figure 11:
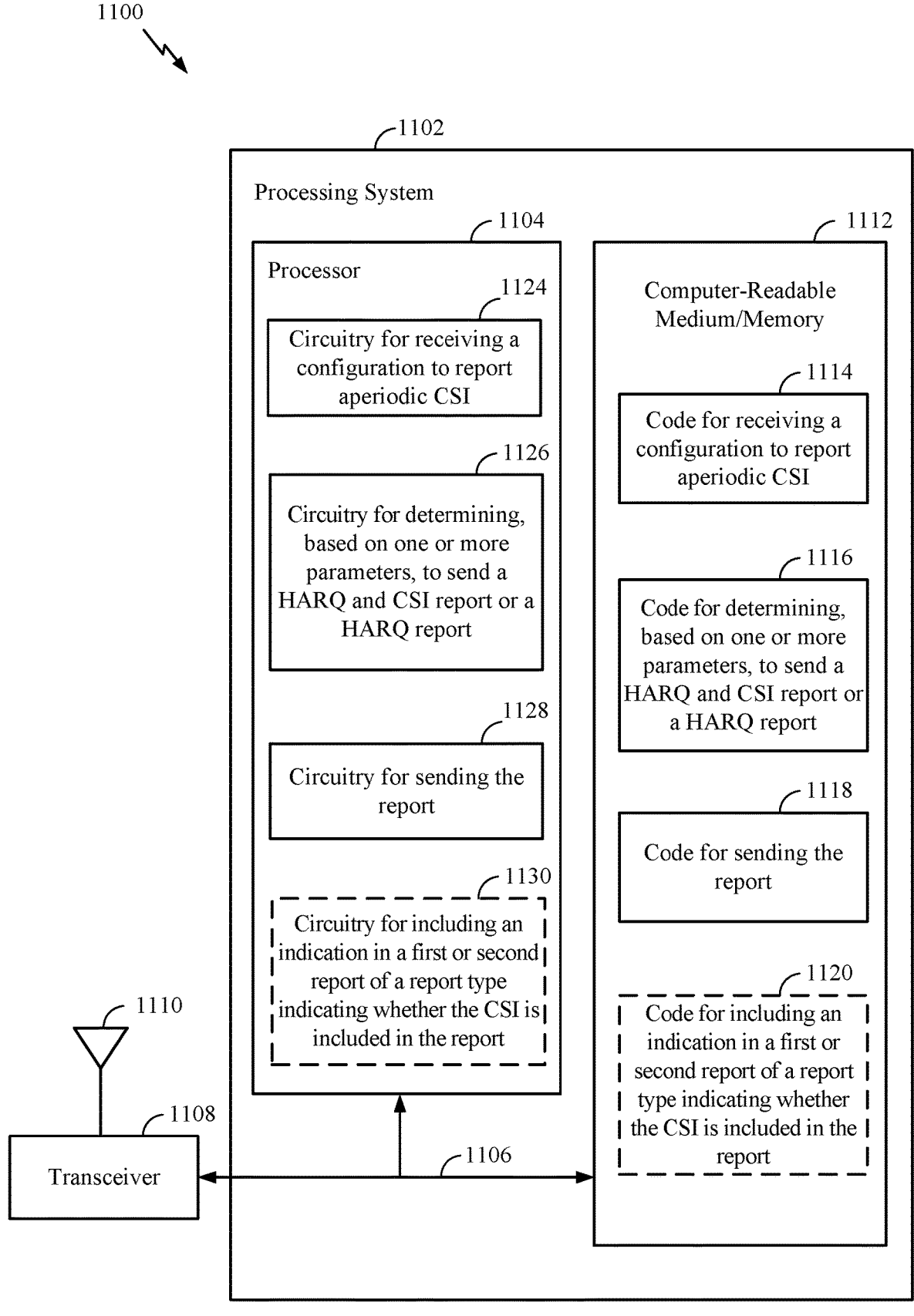
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for CSI reporting based on UE parameters. In certain aspects, computer-readable medium/memory 1112 stores code 1114 for receiving a configuration to report aperiodic CSI; code 1116 for determining, based on one or more parameters, to send a first report including HARQ feedback and not CSI feedback or a second report including HARQ feedback and CSI feedback; and code 1118 for sending the first report or the second report based on the determination. In certain aspects, the computer-readable medium/memory 1120 may store code for including an indication in the first report or the second report of a report type indicating whether the CSI is included in the report. In certain aspects, the processor 1104 has circuitry configured to implement the code stored in the computer-readable medium/memory 1112. The processor 1104 includes circuitry 1124 for receiving a configuration to report aperiodic CSI; circuitry 1126 for determining, based on one or more parameters, to send a first report including HARQ feedback and not CSI feedback or a second report including HARQ feedback and CSI feedback; and circuitry 1128 for sending the first report or the second report based on the determination. In some aspects, the processor 1104 may include circuitry 1130 for including an indication in the first report or the second report of a report type indicating whether the CSI is included in the report.

For example, means for transmitting (or means for outputting for transmission) may include a transmitter unit 254 and/or antenna(s) 252 of the UE 120a illustrated in FIG. 2 and/or circuitry 1128 of the communication device 1100 in FIG. 11. Means for receiving (or means for obtaining) may include a receiver and/or antenna(s) 252 of the UE 120a illustrated in FIG. 2 and/or circuitry 1124 of the communication device 1100 in FIG. 11. Means for communicating may include a transmitter, a receiver or both. Means for generating, means for performing, means for determining, means for taking action, means for determining, means for including may include a processing system, which may include one or more processors, such as the receive processor 258, the transmit processor 264, the TX MIMO processor 266, and/or the controller/processor 280 of the UE 120a illustrated in FIG. 2 and/or the processing system 1102 of the communication device 1100 in FIG. 11.

Figure 12:
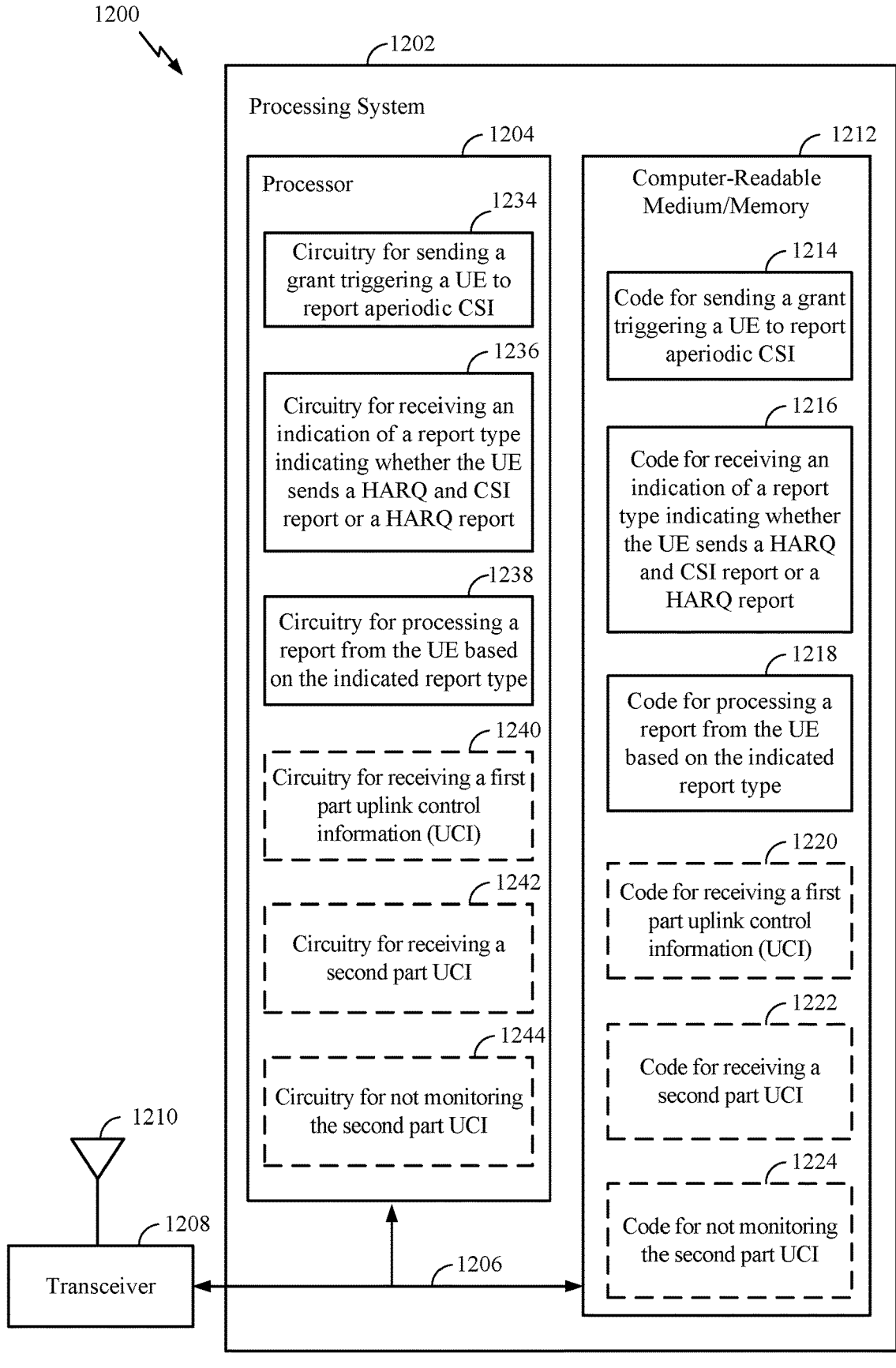
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein for CSI reporting based on UE parameters. In certain aspects, computer-readable medium/memory 1212 stores code 1214 for sending a grant trigger a UE to report aperiodic CSI; code 1216 for receiving an indication, from the UE, of a report type indicating whether the UE sends a first report including HARQ feedback and not CSI feedback or a second report including HARQ feedback and CSI feedback; and code 1218 for processing a report from the UE based on the indicated report type. In certain aspects, the computer-readable medium/memory 1212 may store code 1220 for receiving a first part UCI including the HARQ feedback and the indication of the report type; code 1222 for receiving a second part UCI including the CSI feedback when the indication indicates the UE sends the second report; and/or code 1224 for not monitoring the second part UCI when the indication indicates the UE sends the first report. In certain aspects, the processor 1204 has circuitry configured to implement the code stored in the computer-readable medium/memory 1212. The processor 1204 includes circuitry 1234 for sending a grant triggering a UE to report aperiodic CSI; circuitry 1236 for receiving an indication, from the UE, of a report type indicating whether the UE sends a first report including HARQ feedback and not CSI feedback or a second report including HARQ feedback and CSI feedback; and circuitry 1238 for processing a report from the UE based on the indicated report type. In certain aspects, the processor 1204 may include circuitry 1240 for receiving a first part UCI including the HARQ feedback and the indication of the report type; circuitry 1242 for receiving a second part UCI including the CSI feedback when the indication indicates the UE sends the second report; and/or circuitry 1244 for not monitoring the second part UCI when the indication indicates the UE sends the first report.

For example, means for transmitting (or means for outputting for transmission) may include a transmitter and/or an antenna(s) 234 or the BS 110a illustrated in FIG. 2 and/or circuitry 1234 of the communication device 1200 in FIG. 12. Means for receiving (or means for obtaining) may include a receiver and/or an antenna(s) 234 of the BS 110a illustrated in FIG. 2 and/or circuitry 1236 of the communication device 1200 in FIG. 12. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a illustrated in FIG. 2 and/or the processing system 1202 of the communication device 1200 in FIG. 12.

EXAMPLE ASPECTS

Implementation examples are described in the following numbered aspects:

Aspect 1: A method for wireless communication by a user equipment (UE), the method comprising: receiving a configuration to report aperiodic channel state information (CSI); determining, based on one or more parameters, to send a first report including hybrid automatic repeat request (HARQ) feedback and not CSI feedback or a second report including HARQ feedback and CSI feedback; and sending the first report or the second report based on the determination.

Aspect 2: The method of aspect 1, wherein the one or more parameters include at least one of: an estimated spectral efficiency (SPEF), a received signal quality, a block error rate (BLER), a bit error rate (BER), an estimated interference level, a best next redundancy version, a modulation and coding scheme (MCS), a signal-to-interference-plus-noise ratio (SINR), a number of acknowledged or negative acknowledged code blocks (CBs), a ratio between negative acknowledge CBs over a total number of CBs, a number of acknowledged or negative acknowledged code block groups (CBGs), a ratio between the negative acknowledged CBGs over a total number of CBGs, one or more log-likelihood ratios (LLRs), or a number of resource blocks (RBs) to achieve a target BLER.

Aspect 3: The method of any of aspects 1-2, wherein the determination is further based on a capability of the UE's to perform CSI computations.

Aspect 4: The method of any of aspects 1-3, wherein sending the first report or the second report comprises including an indication in the first report or the second report of a report type indicating whether the CSI is included in the report.

Aspect 5: The method of aspect 4, wherein sending the first report or the second report comprises: sending a first part uplink control information (UCI) including the HARQ feedback and the indication of the report type; and sending a second part UCI including the CSI feedback when the UE sends the first report or excluding the CSI feedback when the UE sends the second report.

Aspect 6: The method of aspect 5, wherein sending the first report or the second report comprises: sending the first part UCI using a first set of resources; and sending the second part UCI using a second set of resources different from the first set of resources.

Aspect 7: The method of aspect 6, wherein the first set of resources and the second set of resources include different slots, different resource blocks within a same slot, or both.

Aspect 8: The method of any of aspects 1-7, wherein receiving the configuration to report the aperiodic CSI comprises receiving a downlink grant for a CSI reference signal (CSI-RS), a physical downlink shared channel (PDSCH), or both triggering the aperiodic CSI.

Aspect 9: The method of any of aspects 1-8, further comprising receiving semi-static signaling via at least one of radio resource control (RRC) or medium access control (MAC) control element (MAC-CE) indicating whether dynamic reporting using the first and second reports is supported.

Aspect 10: The method of aspect 9, further comprising: receiving an indication via downlink control information (DCI) to enable or disable the dynamic reporting.

Aspect 11: The method of aspect 10, wherein the semi-static signaling further indicates a number of downlink grants or a number of time slots for dynamic reporting when enabled.

Aspect 12: The method of aspect 11, wherein when dynamic reporting is not supported, is disabled, or after the indicated number of downlink grants or time slots, the UE determines to send the report including HARQ feedback and includes CSI feedback as configured by the BS.

Aspect 13: The method of any of aspects 1-12, further comprising: determining a decrease of a rank of a current physical downlink shared channel (PDSCH); and sending the rank of the current PDSCH and a channel quality indicator (CQI) per rank.

Aspect 14: A method for wireless communication by a base station (BS), comprising: sending a grant triggering a user equipment (UE) to report aperiodic channel state information (CSI); receiving an indication, from the UE, of a report type indicating whether the UE sends a first report including hybrid automatic repeat request (HARQ) feedback and not CSI feedback or a second report including HARQ feedback and CSI feedback; and processing a report from the UE based on the indicated report type.

Aspect 15: The method of aspect 14, wherein receiving the indication of a report type comprises receiving a first part uplink control information (UCI) including the HARQ feedback and the indication of the report type.

Aspect 16: The method of aspect 15, wherein processing the report based on the indicated report type comprises: receiving a second part UCI including the CSI feedback when the indication indicates the UE sends the second report; and not monitoring the second part UCI when the indication indicates the UE sends the first report.

Aspect 17: The method of any of aspects 13-16, wherein sending the grant triggering the UE to report aperiodic CSI comprises sending a grant for physical downlink shared channel, a CSI reference signal (CSI-RS), or both.

Aspect 18: The method of any of aspects 13-17, further comprising sending semi-static signaling via at least one of radio resource control (RRC) or medium access control (MAC) control element (MAC-CE) indicating whether dynamic reporting using the first and second reports is supported.

Aspect 19: The method of aspect 18, further comprising: sending an indication via downlink control information (DCI) to enable or disable the dynamic reporting.

Aspect 20: The method of aspect 19, wherein the semi-static signaling further indicates a number of downlink grants or a number of time slots for dynamic reporting when enabled.

Aspect 21: The method of aspect 20, wherein when dynamic reporting is not supported, is disabled, or after the indicated number of downlink grants or time slots, the method further comprising receiving the report including HARQ feedback and includes CSI feedback as configured by the BS.

Aspect 22: The method of any of aspects 14-21, further comprising receiving a rank of a current physical downlink shared channel (PDSCH) and a channel quality indicator (CQI) per rank; and determining a subset of layers and precoders to use for remaining PDSCH transmissions.

Aspect 23: An apparatus comprising means for performing the method of any of aspects 1 through 22.

Aspect 24: An apparatus comprising at least one processor and a memory coupled to the at least one processor, the memory comprising code executable by the at least one processor to cause the apparatus to perform the method of any of aspects 1 through 22.

Aspect 25: A computer readable medium storing computer executable code thereon for wireless communications that, when executed by at least one processor, cause an apparatus to perform the method of any of aspects 1 through 22.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks.

The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, the apparatus comprising:

memory comprising computer executable code;

one or more processors configured to, individually or collectively, execute the computer executable code and cause the apparatus to:

receive a configuration to report aperiodic channel state information (CSI);

determine, based on at least one of: one or more reception quality metrics, one or more capabilities of the apparatus, or one or more retransmission parameters, to send a first report type or a second report type, the first report type including hybrid automatic repeat request (HARQ) feedback and not aperiodic CSI feedback and the second report type including the HARQ feedback and the aperiodic CSI feedback; and send a report of the first report type or the second report type based on the determination, wherein the report includes a report type indicator that indicates the report is of the first report type or is of the second report type.

2. The apparatus of claim 1, wherein;

the one or more reception metrics includes at least one of:

an estimated spectral efficiency (SPEF), a received signal quality, a block error rate (BLER), a bit error rate (BER), an estimated interference level, a signal-to-interference plus noise ratio (SINR), or one or more log-likelihood ratios (LLRs); and the one or more retransmission parameters includes at least one of: a best next redundancy version, a modulation and coding scheme (MCS), a number of acknowledged or negative acknowledged code blocks (CBs), a ratio between negative acknowledge CBs over a total number of CBs, a number of acknowledged or negative acknowledged code block groups (CBGs), a ratio between the negative acknowledged CBGs over a total number of CBGs, or a number of resource blocks (RBs) to achieve a target BLER.

3. The apparatus of claim 1, wherein the one or more capabilities of the apparatus includes a capability of the apparatus to perform CSI computations.

4. The apparatus of claim 1, wherein to cause the apparatus to send the report, the one or more processors are configured to, individually or collectively, cause the apparatus to:

send a first part uplink control information (UCI) including the HARQ feedback and the report type indicator; and send a second part UCI including the CSI feedback when the apparatus sends the report of the second report type or excluding the second part of the UCI including the CSI feedback when the apparatus sends the report of the first report type.

5. The apparatus of claim 4, wherein to cause the apparatus to send the report, the one or more processors are configured to, individually or collectively, cause the apparatus to:

send the first part UCI using a first set of resources; and send the second part UCI using a second set of resources different from the first set of resources.

6. The apparatus of claim 5, wherein the first set of resources and the second set of resources include different slots, different resource blocks within a same slot, or both.

7. The apparatus of claim 1, wherein to cause the apparatus to receive the configuration to report the aperiodic CSI, the one or more processors are configured to, individually or collectively, cause the apparatus to receive a downlink grant for a CSI reference signal (CSI-RS), a physical downlink shared channel (PDSCH), or both triggering reporting of the aperiodic CSI.

8. The apparatus of claim 1, wherein the one or more processors are configured to, individually or collectively, cause the apparatus to receive semi-static signaling via at least one of radio resource control (RRC) or medium access control (MAC) control element (MAC-CE) indicating whether dynamic CSI reporting using the first report type and the second report type is supported.

9. The apparatus of claim 8, wherein the one or more processors are configured to, individually or collectively, cause the apparatus to receive an indication via downlink control information (DCI) to enable or disable the dynamic CSI reporting.

10. The apparatus of claim 9, wherein the semi-static signaling further indicates a number of downlink grants or a number of time slots for the dynamic CSI reporting.

11. The apparatus of claim 10, wherein the one or more processors are configured to, individually or collectively, cause the apparatus to determine, when dynamic CSI reporting is not supported, when CSI reporting is disabled, or after the indicated number of downlink grants or time slots, to send the report of the second type.

12. The apparatus of claim 1, wherein the one or more processors are configured to, individually or collectively, cause the apparatus to:

determine a decrease of a rank of a current physical downlink shared channel (PDSCH); and send the rank of the current PDSCH and a channel quality indicator (CQI) per rank.

13. An apparatus for wireless communication, the apparatus comprising:

memory comprising computer executable code;

one or more processors configured to, individually or collectively, execute the computer executable code and cause the apparatus to:

send a grant triggering a user equipment (UE) to report aperiodic channel state information (CSI);

receive a report, from the UE, including a report type indicator that indicates the report is of a first report type including hybrid automatic repeat request (HARQ) feedback and not aperiodic CSI feedback or is of a second report type including the HARQ feedback and the aperiodic CSI feedback; and process a report from the UE based on the indicated report type.

14. The apparatus of claim 13, wherein to cause the apparatus to receive the report type indicator, the one or more processors are configured to, individually or collectively, cause the apparatus to receive a first part uplink control information (UCI) including the HARQ feedback and the report type indicator.

15. The apparatus of claim 14, wherein to cause the apparatus to process the report based on the indicated report type, the one or more processors are configured to, individually or collectively, cause the apparatus to:

monitor a second part UCI including the aperiodic CSI feedback when the indication in the first part UCI indicates the second report type; and not monitor the second part UCI when the indication indicates the first report type.

16. The apparatus of claim 13, wherein to cause the apparatus to send the grant triggering the UE to report the aperiodic CSI, the one or more processors are configured to, individually or collectively, cause the apparatus to send a grant for a physical downlink shared channel, a CSI reference signal (CSI-RS), or both.

17. The apparatus of claim 13, wherein the one or more processors are configured to, individually or collectively, cause the apparatus to send semi-static signaling via at least one of radio resource control (RRC) or medium access control (MAC) control element (MAC-CE) indicating whether dynamic reporting using the first report type and the second report type is supported.

18. The apparatus of claim 17, wherein the one or more processors are configured to, individually or collectively, cause the apparatus to send an indication via downlink control information (DCI) to enable or disable the dynamic CSI reporting.

19. The apparatus of claim 18, wherein the semi-static signaling further indicates a number of downlink grants or a number of time slots for dynamic CSI reporting when enabled.

20. The apparatus of claim 19, wherein the one or more processors are configured to, individually or collectively, cause the apparatus to receive, when dynamic CSI reporting is not supported, when dynamic CSI reporting is disabled, or after the indicated number of downlink grants or time slots, the second type of report.

21. The apparatus of claim 13, wherein the one or more processors are configured to, individually or collectively, cause the apparatus to:

receive a rank of a current physical downlink shared channel (PDSCH) and a channel quality indicator (CQI) per rank; and determine a subset of layers and precoders to use for remaining PDSCH transmissions.

22. A method for wireless communication by a user equipment (UE), the method comprising:

receiving a configuration to report aperiodic channel state information (CSI);

determining, based on at least one of: one or more reception quality metrics, one or more capabilities of the UE, or one or more retransmission parameters, to send a first report type or a second report type, the first report type including hybrid automatic repeat request (HARQ) feedback and not aperiodic CSI feedback and the second report type including the HARQ feedback and the aperiodic CSI feedback; and sending a report of the first report type or the second report type based on the determination, wherein the report includes a report type indicator that indicates the report of the first report type or is of the second report type.

23. The method of claim 22, wherein:

the one or more reception metrics includes at least one of: an estimated spectral efficiency (SPEF), a received signal quality, a block error rate (BLER), a bit error rate (BER), an estimated interference level, a signal-to-interference plus noise ratio (SINR), or one or more log-likelihood ratios (LLRs); and the one or more retransmission parameters includes at least one of: a best next redundancy version, a modulation and coding scheme (MCS), a number of acknowledged or negative acknowledged code blocks (CBs), a ratio between negative acknowledge CBs over a total number of CBs, a number of acknowledged or negative acknowledged code block groups (CBGs), a ratio between the negative acknowledged CBGs over a total number of CBGs, or a number of resource blocks (RBs) to achieve a target BLER.

24. The method of claim 22, wherein the one or more capabilities of the UE includes a capability of the UE to perform CSI computations.

25. A method for wireless communication by a base station (BS), the method comprising:

sending a grant triggering a user equipment (UE) to report aperiodic channel state information (CSI);

receiving a report, from the UE, including a report type indicator that indicates the report type is of a first report type including hybrid automatic repeat request (HARQ) feedback and not aperiodic CSI feedback or is of a second report type including the HARQ feedback and the aperiodic CSI feedback; and processing a report from the UE based on the indicated report type.

26. The method of claim 25, wherein receiving the report type indicator comprises receiving a first part uplink control information (UCI) including the HARQ feedback and the report type indicator.

27. The method of claim 26, wherein processing the report based on the indicated report type comprises:

monitoring a second part UCI including the aperiodic CSI feedback when the indication indicates the second report type; and not monitoring the second part UCI when the indication indicates the first report type.

28. The method of claim 25, wherein sending the grant triggering the UE to report aperiodic CSI comprises sending a grant for a physical downlink shared channel (PDSCH), a CSI reference signal (CSI-RS), or both.

* * * * *